UNITED STATES PATENT OFFICE.

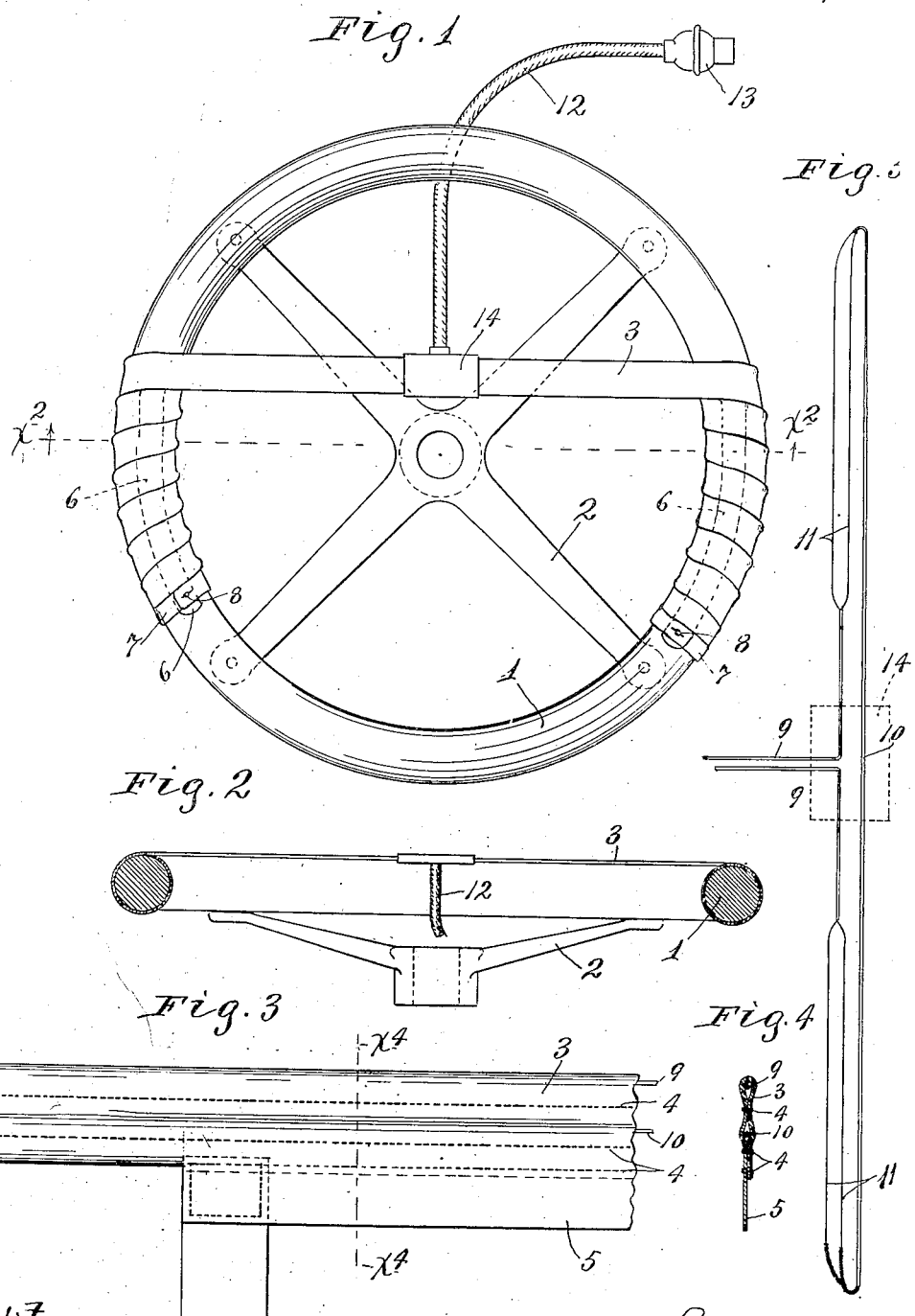

EVEN J. ROHNE, OF MINNEAPOLIS, MINNESOTA.

ELECTRIC HEATER FOR STEERING-WHEELS.

1,230,788.

Specification of Letters Patent.

Patented June 19, 1917.

Application filed December 4, 1915. Serial No. 64,944.

*To all whom it may concern:*

Be it known that I, EVEN J. ROHNE, a citizen of the United States, residing at Minneapolis, in the county of Hennepin and State of Minnesota, have invented certain new and useful Improvements in Electric Heaters for Steering-Wheels; and I do hereby declare the following to be a full, clear, and exact description of the invention, such as will enable others skilled in the art to which it appertains to make and use the same.

Particularly, my invention has for its object to provide an extremely simple and highly efficient electric heater or warming device for steering wheels or other hand pieces of a steering device of automobiles; and to such ends, generally stated, the invention consists of the novel construction and arrangement of parts hereinafter described and defined in the claims.

In the accompanying drawings which illustrate the invention, like characters indicate like parts throughout the several views.

Referring to the drawings:

Figure 1 is a plan view showing the improved electric heater applied to the steering wheel of an automobile;

Fig. 2 is a section taken on the line $x^2$—$x^2$ of Fig. 1;

Fig. 3 is a plan view showing a portion of the flexible electrical heater;

Fig. 4 is a section on the line $x^4$—$x^4$ of Fig. 3; and

Fig. 5 is a diagrammatic view showing the wires of the flexible heater.

In Figs. 1 and 2, the numeral 1 indicates the annular rim and the numeral 2 the hub and arms of a steering wheel, such as generally used in connection with automobiles. Here it may be stated that the term "automobile" may be used in a broad sense to include any motor propelled vehicle.

The heater proper is in the form of a long flexible ribbon which may be made of leather, cloth, pentesote, or other suitable flexible material 3, which is folded upon itself to form a flat casing stitched together on lines marked 4. For an important purpose, one edge portion of the flexible material 3 is projected beyond the other edge thereof to afford a so-called clamping flap 5.

The clamping flap 5 is preferably not extended along that portion of the flexible ribbon which extends across from one side to the other of the steering wheel when the heater is applied to the said wheel. Otherwise stated, the said flaps 5 are formed only on those portions of the ribbon that are to be wound around the rim of the steering wheel; and when the said ribbon is wound spirally around the rim of the steering wheel, the body portions thereof will be lapped over and clamped onto underlying portions of the said clamping flaps 5, so as to thereby not only give better frictional contact between the ribbon and the wheel rim, but also to frictionally lock the coils of the ribbon against lateral separation.

At the inner extremities of the flaps 5 are attached laterally extended anchoring straps 6 which are laid directly against the rim of the steering wheel and over each of which several of the coils of the wound portion of the ribbon are tightly clamped, so as to thereby further insure better frictional engagement between the ribbon and the wheel rim and between certain of the coils of the ribbon. At its ends, the ribbon may be fastened by various means, but preferably, it is provided with elastic extensions 7 having button holes at their extreme ends adapted to be applied over buttons 8 the said flexible portions some distance from the ends thereof.

The electrical heating elements of the heater are incased within longitudinal compartments formed between the back edge of the ribbon and the first row of stitches 4, and between the first and second rows of the said stitches 4. These heating elements are preferably wires and they may be connected, either in series or in multiple. In Fig. 5, they are shown as connected in series.

Referring to said view, Fig. 5, the relatively large conducting wires are indicated by the numerals 9 and 10 and the relatively small hot wires are indicated by the numeral 11. The wires 9 are extended through an insulating tube 12 that is attached at one end to the central or intermediate portion of the ribbon and it is provided at its other end with a suitable electric coupling 13 adapted to be connected in the usual way to the live circuit wires, not shown, which would lead from a battery or other suitable source of electrical energy, which, in automobile service, may be either a generator magneto or battery, according to the type thereof. The hot wires 11, must be suitably insulated from each other, and when inserted in the casing afforded by the flexible ribbon, will, as is evident, be insulated both from the wheel rim and from the hands of the operator. Furthermore, they may be independently insulated, as for example, the construction disclosed and claimed in my prior Patent No. 1,133,579, of date, March 30, 1915, entitled "electrical heating element."

When the ribbon-like heater is applied, as shown in Fig. 1, for example, it will have a spirally corrugated exterior surface formed partly by the manner in which it is wound upon the wheel rim, and partly by the ridges given thereto by the insulated wires 9, 10 and 11, and this, as is evident, gives a gripping surface upon which the hands will not slip.

To the central portion of the ribbon 3 is applied a reinforcement 14 made of heavy cloth, or similar flexible material and made to completely embrace the said ribbon. This reinforcement 14 will be sewed or stitched to the ribbon, and when thus applied, it serves to hold the wires 9 and 10 against spreading and properly positioned at the point where the connection is made to the wires of the cable 12. This portion is shown in full in Fig. 1, and its position in respect to the wires is indicated by dotted lines in Fig. 5.

The so-called anchoring straps 6 are preferably made of cloth or other material that has a rough upper surface, so that the coils of the ribbon will not readily slip thereon, and as a more important feature, the undersurfaces of said straps are preferably provided with an adhesive surface, such as provided on commercial adhesive tape, so that it will stick to the smooth surface of the rim of a steering wheel, and prevent slipping of the coils or wound portions of the ribbon bodily upon the said rim.

Obviously, this flexible heating device may be applied to hand pieces of various different forms, and furthermore, may be wrapped around various other devices which it may be desired to heat or warm. The heating device is of small cost, may be easily applied to or removed from a steering wheel rim, or the like, and furthermore, is highly efficient for the purposes had in view.

What I claim is:

1. The combination with the hand piece of a vehicle steering device, of a flexible ribbon-like electric heater spirally wound around the same and having overlapping portions holding the coils of said heater against lateral separation and assisting in anchoring the heater as an entirety to the said hand piece.

2. The combination with the hand piece of a vehicle steering device, of a flexible ribbon-like electric heater spirally wound around the same and having overlapping portions holding the coils of said heater against lateral separation and assisting in anchoring the heater as an entirety to the said hand piece, the said heater having an unwound intermediate portion and provided with current supplying wires connected to said unwound portion.

3. The combination with a steering wheel having an annular rim, of a flexible ribbon-like electrical heating element extended across from one side to the other of said rim and spirally wound around the said rim and anchored thereto, the spirally wound portions of said ribbon-like body having projecting clamping flaps overlapped by adjacent coils thereof.

4. The combination with a steering wheel having an annular rim, of a flexible ribbon-like electrical heating element extended across from one side to the other of said rim and spirally wound around the said rim and anchored thereto, the said ribbon-like body, at points where it contacts with said rim, having laterally projecting clamping straps overlapped by coils thereof.

In testimony whereof I affix my signature in presence of two witnesses.

EVEN J. ROHNE.

Witnesses:
HARRY D. KILGORE,
F. D. MERCHANT.